US009081765B2

(12) United States Patent
Kagan et al.

(10) Patent No.: US 9,081,765 B2
(45) Date of Patent: Jul. 14, 2015

(54) DISPLAYING EXAMPLES FROM TEXTS IN DICTIONARIES

(71) Applicant: ABBYY InfoPoisk LLC, Moscow (RU)

(72) Inventors: Dmitry Kagan, Moscow (RU); Tatiana Parfentieva, Moscow (RU); Konstantin Zuev, Moscow (RU); Dmitry Skopintsev, Moscow (RU)

(73) Assignee: ABBYY InfoPoisk LLC (RU)

(*) Notice: Subject to any disclaimer, the term of this patent is extended or adjusted under 35 U.S.C. 154(b) by 130 days.

(21) Appl. No.: 13/710,060

(22) Filed: Dec. 10, 2012

(65) Prior Publication Data

US 2013/0211819 A1 Aug. 15, 2013

Related U.S. Application Data

(63) Continuation-in-part of application No. 13/396,146, filed on Feb. 14, 2012, now Pat. No. 8,812,304, and a continuation-in-part of application No. 12/540,148, filed on Aug. 12, 2009, now Pat. No. 8,135,581.

(60) Provisional application No. 61/088,191, filed on Aug. 12, 2008, provisional application No. 61/088,199, filed on Aug. 12, 2008.

(51) Int. Cl.
*G06F 17/30* (2006.01)
*G06F 17/28* (2006.01)
*G06F 17/27* (2006.01)

(52) U.S. Cl.
CPC ............ *G06F 17/28* (2013.01); *G06F 17/2735* (2013.01); *G06F 17/2818* (2013.01); *G06F 17/2827* (2013.01)

(58) Field of Classification Search
CPC ..... G06F 17/277; G06F 17/28; G06F 17/2785
USPC ........................................................... 704/10
See application file for complete search history.

(56) References Cited

U.S. PATENT DOCUMENTS

| | | | |
|---|---|---|---|
| 5,995,922 A | 11/1999 | Pentheroudakis et al. | |
| 6,092,034 A * | 7/2000 | McCarley et al. | ................ 704/2 |
| 6,128,635 A | 10/2000 | Ikeno | |
| 6,173,253 B1 | 1/2001 | Abe | |
| 6,282,508 B1 | 8/2001 | Kumura et al. | |
| 6,490,576 B1 | 12/2002 | Nishiguchi | |
| 6,651,220 B1 | 11/2003 | Pentheroudakis et al. | |
| 6,735,559 B1 | 5/2004 | Takazawa | |
| 6,772,139 B1 | 8/2004 | Smith, III | |
| 6,789,057 B1 | 9/2004 | Morimoto | |
| 6,961,722 B1 | 11/2005 | Bruecken | |
| 6,996,520 B2 * | 2/2006 | Levin | ............................. 704/10 |
| 7,233,950 B2 | 6/2007 | Smith | |

(Continued)

*Primary Examiner* — Leslie Wong
(74) *Attorney, Agent, or Firm* — LeighAnn Weiland; Veronica Weinstein

(57) ABSTRACT

In one embodiment, the invention provides a method for a system to provide information based on a query, the method comprising: performing a first search of at least one first source for information responsive to the query; providing a result of the search to a user; searching documents using at least a part of the result of the search; providing the user with at least one example of usage of the result of the search obtained from the searching of stored documents; based on user input, performing a second search of at least one second source for information responsive to the query; and providing a result of said second search to the user. The invention provides ways of showing the most relevant examples from parallel text corpora according to a ranking.

22 Claims, 9 Drawing Sheets

(56) References Cited

U.S. PATENT DOCUMENTS

| | | |
|---|---|---|
| 7,296,229 B2 | 11/2007 | Berstis |
| 7,313,516 B2 | 12/2007 | Oshima |
| 7,519,528 B2 * | 4/2009 | Liu et al. .................... 704/2 |
| 7,627,816 B2 | 12/2009 | Bhogal et al. |
| 7,825,901 B2 | 11/2010 | Potera |
| 7,827,165 B2 | 11/2010 | Abernethy, Jr. et al. |
| 7,983,903 B2 * | 7/2011 | Gao ........................... 704/10 |
| 8,051,061 B2 * | 11/2011 | Niu et al. ................... 707/706 |
| 8,275,604 B2 * | 9/2012 | Jiang et al. ................. 704/4 |
| 8,332,205 B2 * | 12/2012 | Krishnan et al. ........... 704/4 |
| 2004/0006460 A1 | 1/2004 | Katayama |
| 2004/0210435 A1 | 10/2004 | Oshima |
| 2006/0009963 A1 * | 1/2006 | Gaussier et al. ............ 704/7 |
| 2006/0173886 A1 * | 8/2006 | Moulinier et al. .......... 707/101 |
| 2007/0168182 A1 | 7/2007 | Abe |
| 2007/0192318 A1 | 8/2007 | Ramer et al. |
| 2007/0250587 A1 | 10/2007 | Roberts |
| 2008/0262826 A1 * | 10/2008 | Pacull ......................... 704/3 |
| 2009/0171654 A1 * | 7/2009 | Spain .......................... 704/7 |
| 2009/0222437 A1 * | 9/2009 | Niu et al. .................... 707/5 |
| 2009/0282007 A1 | 11/2009 | Abe |
| 2010/0010977 A1 | 1/2010 | Choi et al. |
| 2010/0042617 A1 | 2/2010 | Matveenko et al. |
| 2010/0145673 A1 * | 6/2010 | Cancedda ................... 704/3 |
| 2010/0312544 A1 * | 12/2010 | Ako ............................ 704/3 |
| 2011/0137635 A1 * | 6/2011 | Chalabi et al. ............. 704/2 |
| 2011/0137636 A1 | 6/2011 | Srihari et al. |
| 2011/0161144 A1 | 6/2011 | Mizuguchi et al. |
| 2011/0202334 A1 * | 8/2011 | Abir ............................ 704/4 |
| 2011/0238406 A1 * | 9/2011 | Chen et al. ................. 704/3 |
| 2012/0023399 A1 * | 1/2012 | Hoshino et al. ............ 715/256 |

* cited by examiner

DISPLAYING EXAMPLES FROM TEXTS IN DICTIONARIES

CROSS-REFERENCE TO RELATED APPLICATIONS

For purposes of USPTO extra-statutory requirements, this application is a continuation-in-part of, and claims the benefit of priority to, U.S. patent application Ser. No. 13/396,146, initially titled METHOD AND SYSTEM FOR DOWNLOADING ADDITIONAL SEARCH RESULTS INTO ELECTRONIC DICTIONARIES, filed on 14 Feb. 2012 which is a continuation-in-part of U.S. patent application Ser. No. 12/540,148, now U.S. Pat. No. 8,135,581 titled METHOD AND SYSTEM FOR DOWNLOADING ADDITIONAL SEARCH RESULTS INTO ELECTRONIC DICTIONARIES, filed on 12 Aug. 2009. The '148 application claims the benefit of priority to provisional U.S. Patent Applications 61/088,191 and 61/088,199 both of which were filed on 12 Aug. 2008. The entire specifications of the above-referenced applications are incorporated herein by reference to the extent that each does not conflict with the present disclosure.

BACKGROUND OF THE INVENTION

1. Field

Embodiments of the present invention are directed towards methods and systems for displaying search results from search engines, text corpora, and electronic dictionaries.

2. Description of the Related Art

Electronic dictionaries often include a software program and dictionaries proper. The software program may include a shell, which provides a graphical user interface, morphology models to display inflected forms, context search that uses an index, a teaching module, etc. The dictionaries may be divided into separate units—either text or compiled files.

The software program may be installed locally on a user's computer, remotely on a server in a local area network or on a wide area network such the Internet. The dictionaries that a user needs to use may be independently stored in various locations. Electronic dictionaries then may access various separate dictionary files or "dictionaries" from the various locations.

SUMMARY

In one embodiment, the invention provides an electronically implemented method and a system to provide information based on a query, the method comprising: performing a first search of at least a first source for information responsive to the query; providing a result of the search, including results of searching examples in parallel corpora, to a user; based on user input, performing a second search of at least one second source for information responsive to the query; and providing a result of said second search to the user. In one embodiment, the invention provides showing the examples from parallel text corpora in such a way that most relevant examples are presented in the top of the list. In other embodiments, these relevant examples are made available on demand such as in response to detecting an interaction with a user interface element of a user interface.

BRIEF DESCRIPTION OF THE DRAWINGS

FIG. 2C shows the search control panel of the GUI of FIG. 2A in greater detail.

FIG. 2D shows user interface for selecting search results and providing the results of searching examples in parallel corpora.

DETAILED DESCRIPTION

Broadly, embodiments of the present invention disclose a dictionary device that allows a user to obtain translations from additional sources, e.g. dictionaries, when the user needs these translations. For example, if the user has not found a suitable translation based on a first search of existing dictionaries, the user can click on a link and obtain search results from additional dictionaries or using examples from other intranet- or internet-based resources, such as, text corpora, TM-bases, forums, online-encyclopedias and other search results. The user can also point at a translation in the list of possible translations so as to obtain a display of examples of use of the translated word from parallel corpora. Parallel corpora are a collection of translated texts. The corresponding texts are referred to as parallel texts. Each pair of parallel texts includes a text in a source language and its translation into output language, aligned by paragraphs or sentences, so that each sentence in the source language corresponds to the sentence in the output language and vice versa. Thus, the user can see in what context a selected variant of translation is used. Parallel corpora may be stored in connection with a local or remote server as discussed below, and the parallel corpora may be indexed so as to facilitate searching. The parallel corpora are typically searched by original and translation word or expression pairs to find examples of word use or expression use.

Additionally, a user can customize a list of additional dictionaries in accordance with the user's preferences. Moreover, the user may not even know which dictionaries are installed locally and which are installed remotely if an active network connection is available and accessed.

Figure 1:
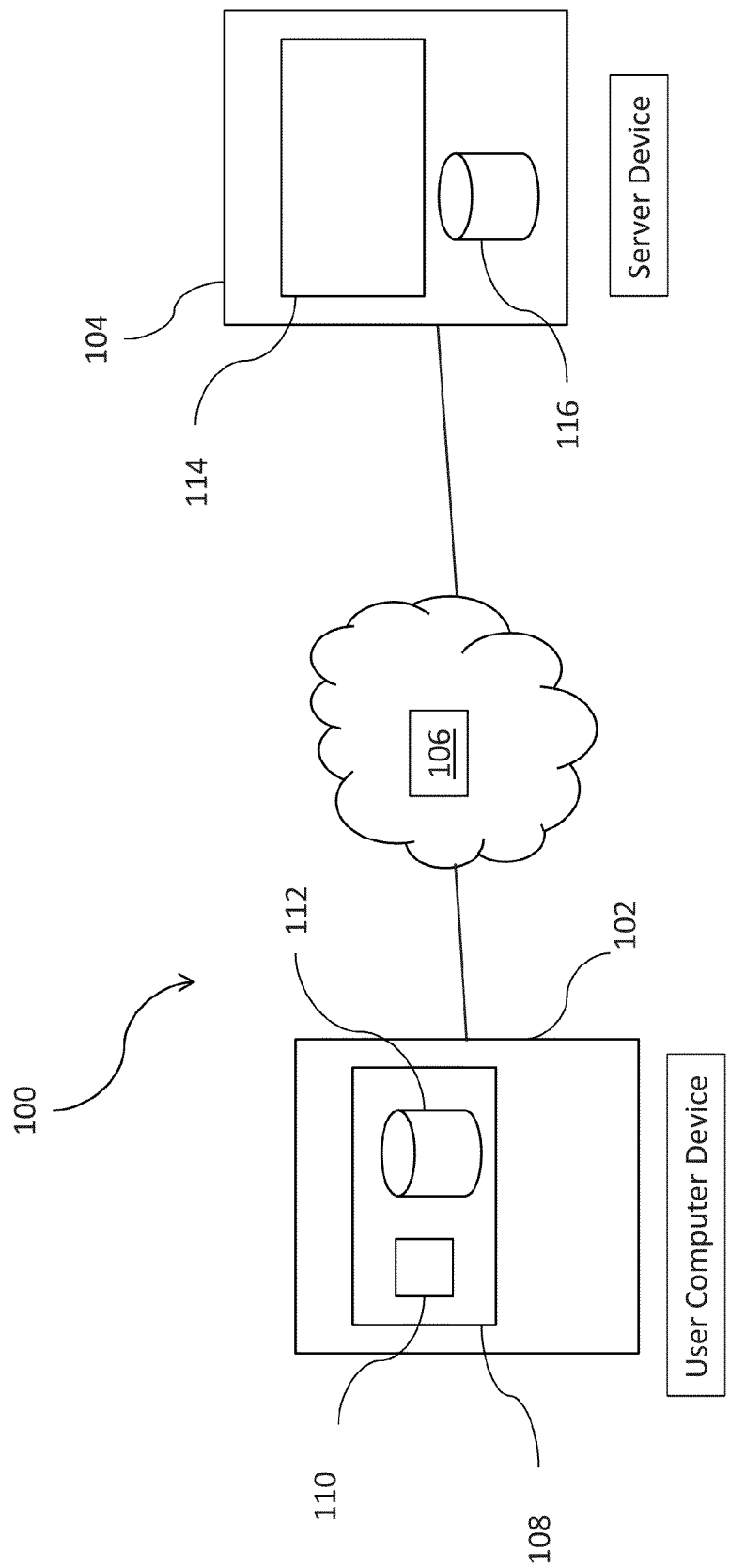
FIG. 1 shows a high-level block diagram of a network configuration for practicing embodiments of the invention.

Referring now to FIG. 1, there is shown a network configuration 100 for practicing embodiments of the present invention. The network configuration 100 comprises a user computer device 102 that is coupled to a server device 104 via an intermediate network 106. In accordance with different embodiments, the intermediate network 106 may comprise a local area network (LAN) or a wide area network (WAN) such as the Internet.

The user computer device 102 may comprise a general purpose computer embodied in different configurations such as a desktop personal computer (PC), or laptop computer.

Figure 5:
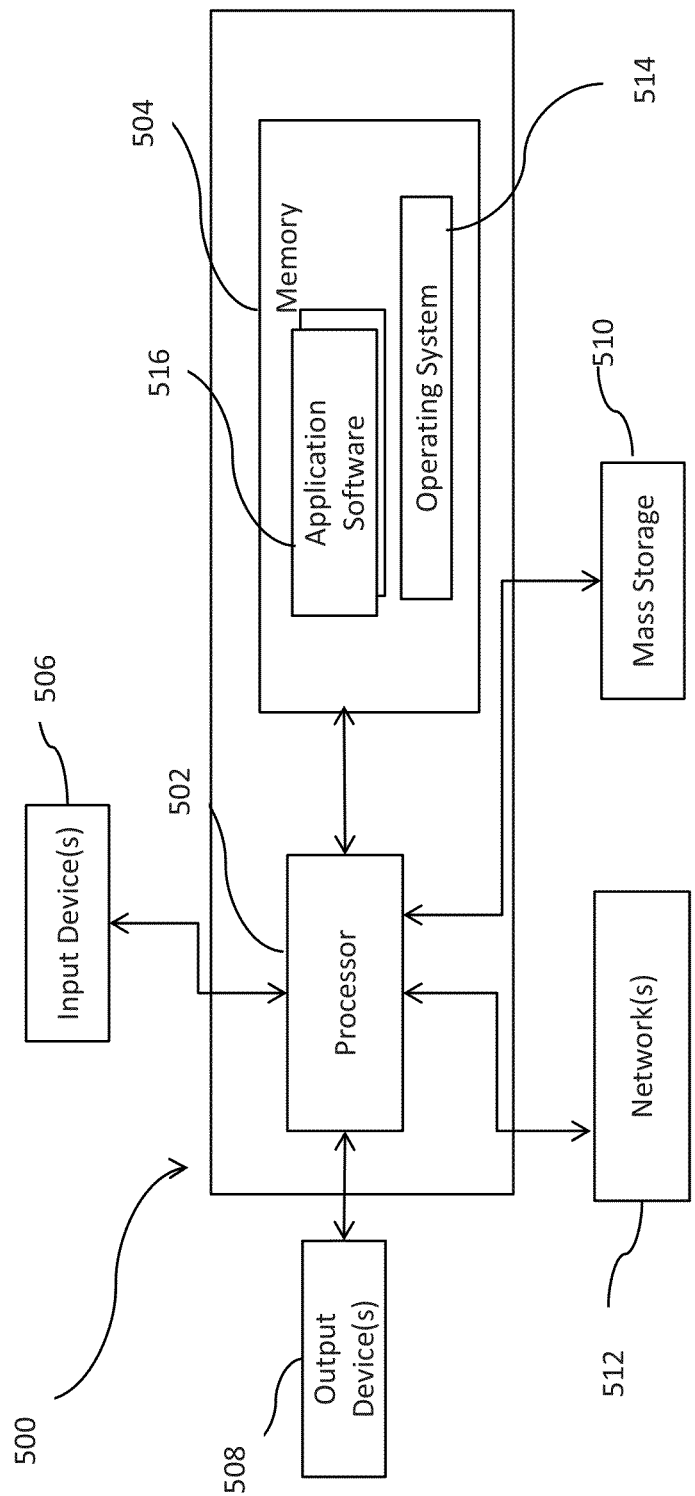
FIG. 5 shows exemplary hardware for implementing a user computer device or a server device, in accordance with one embodiment of the invention.

FIG. 5 shows exemplary hardware 500 for implementing the user computer device 102, in accordance with one embodiment.

The user computer device 102 may comprise software that includes a client dictionary application 108 to implement the techniques disclosed herein. The application 108 may comprises a dictionary shell 110 and one or more local dictionaries 112.

The server device 104 may also be implemented using the hardware 500 of FIG. 5. In one embodiment, the server device 104 may be provisioned with server dictionary software 114 to implement the techniques disclosed herein. The server device may also be provisioned with one or more remote or online dictionaries 116.

Figure 2A:
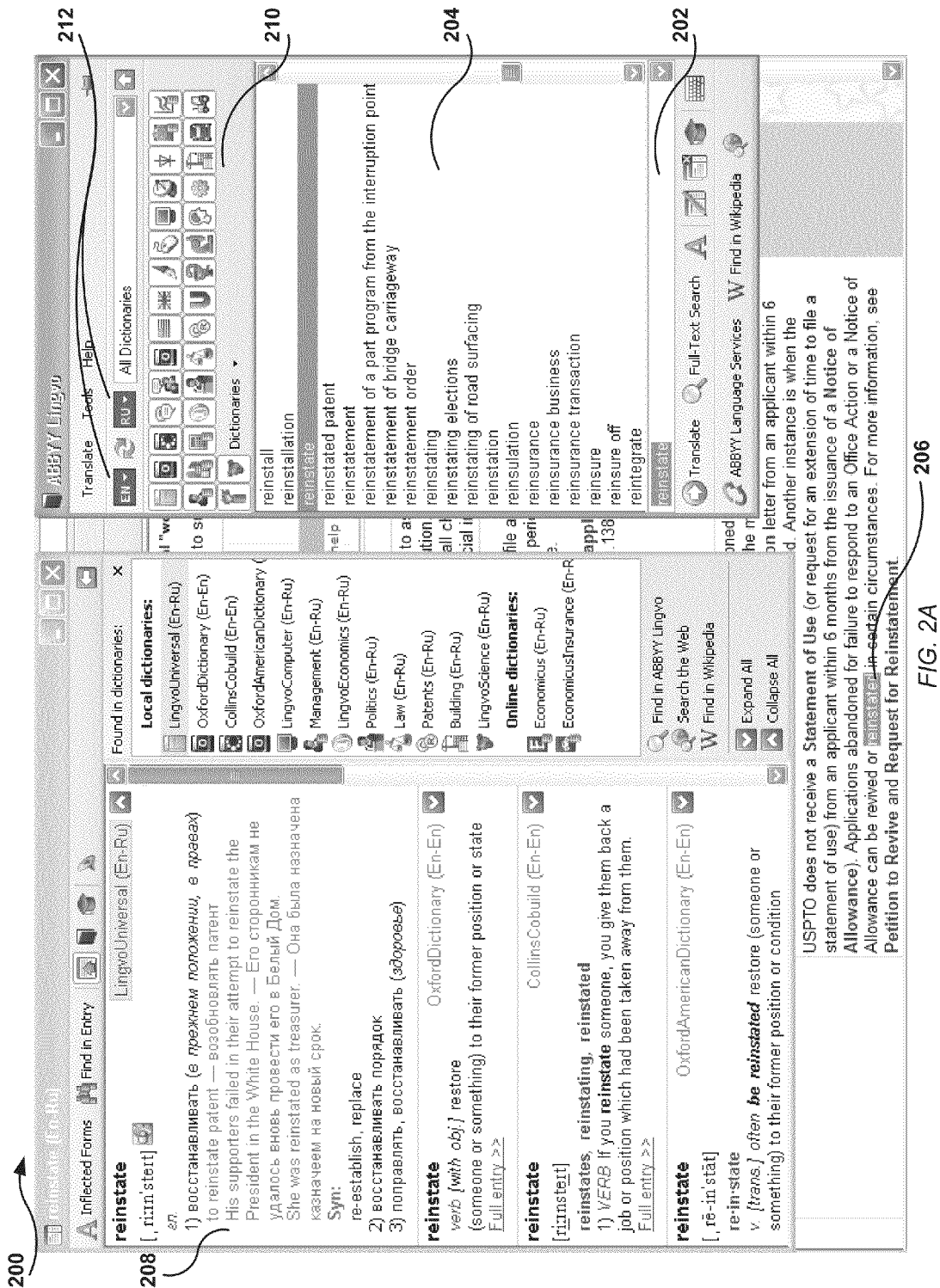
FIG. 2A shows a graphical user interface (GUI) to facilitate local and online dictionary searches, in accordance with one embodiment of the invention.

The dictionary shell 110 may provide a graphical user interface (GUI) to facilitate searching of the local and online dictionaries. One embodiment of the GUI 200 is illustrated in FIG. 2A. Referring to FIG. 2A, the GUI 200 comprises a search entry window 202 wherein a user can enter one or more words or expressions defining a query. Alternatively the GUI 200 may allow the user to select words or expressions for a query from a word list 204. In one embodiment, the user can simply select a word 206 from a text application to define the query. One or more dictionary entry windows 208 may be opened if the word is found in local or online dictionaries.

Advantageously, the local and online dictionaries that can be accessed with the application 108 may be presented on a bookshelf 210 for a selected pair 212 of languages.

The bookshelf 210 comprises icons, each representing a particular topic dictionary, e.g., "Auto," "Accounting," "Computers." In one embodiment, only the dictionaries whose icons are displayed on the bookshelf 210 are used for translation. In another embodiment, the search results from other sources may be offered to the user. In some embodiments, a user may be allowed to select or choose a bookshelf (and all corresponding dictionaries) from a drop-down list of bookshelves. Available bookshelves may include "All Dictionaries," "General Dictionaries," "Science Dictionaries," etc. A user may disable any dictionary on the bookshelf 210 by clicking on its icon. A disabled dictionary is not used in translation or search even though it is shown on the bookshelf 210. Icons corresponding to disable dictionaries are distinguished visually, e.g., they are "grayed out". A dictionary may be placed or represented on several bookshelves. Enabling or disabling a dictionary on one bookshelf does not affect its status on other bookshelves.

Figure 2B:
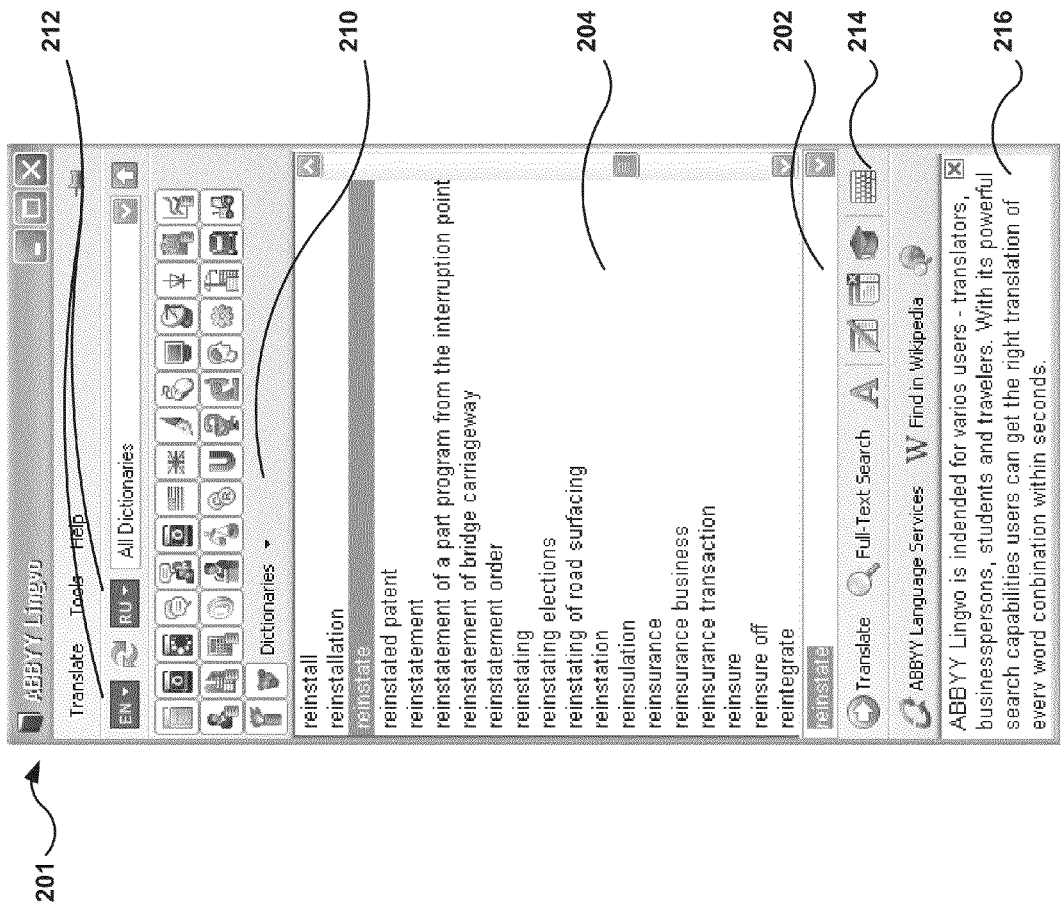
FIG. 2B shows the search control panel of the GUI of FIG. 2A in greater detail.
Figure 2C:
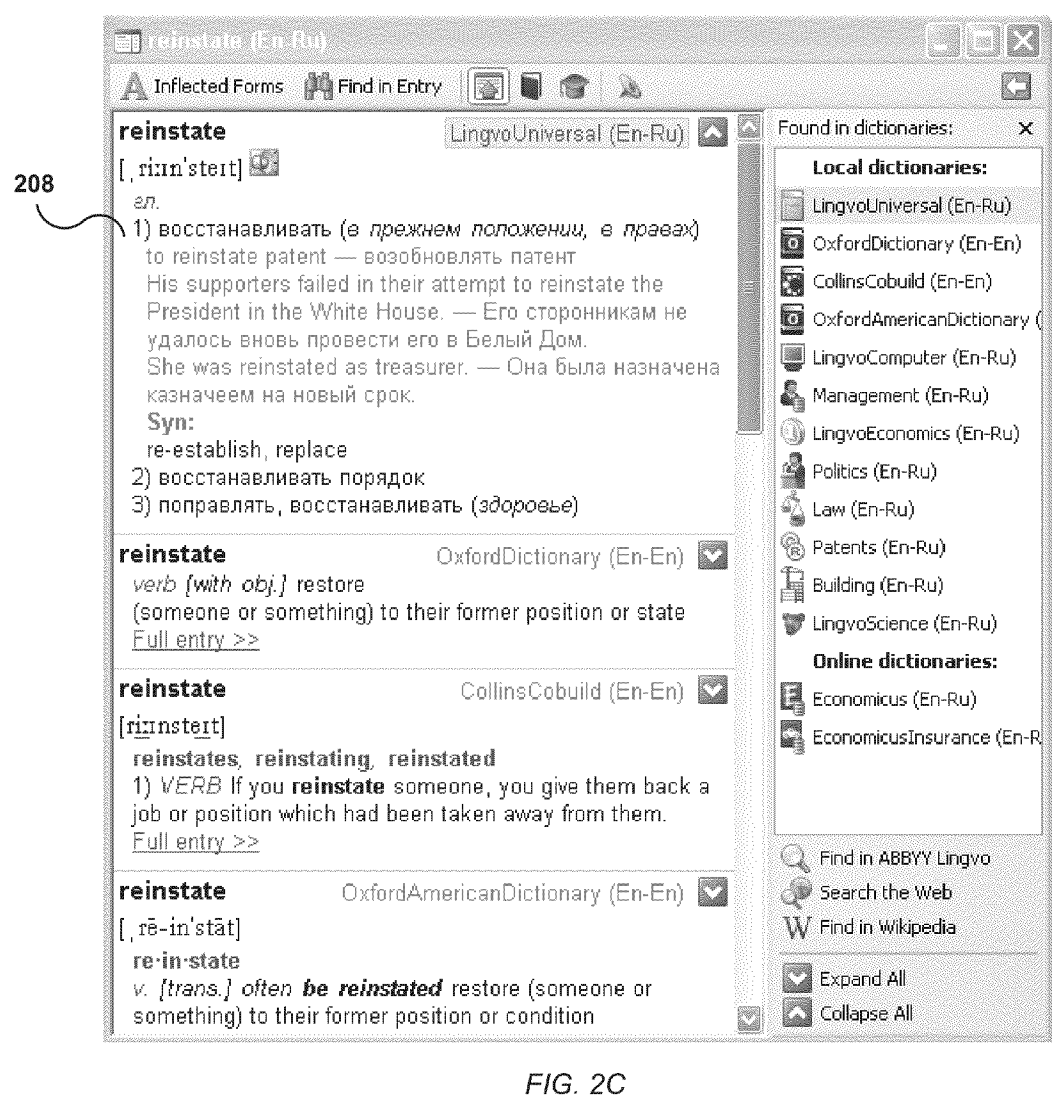

With reference to FIG. 2B, in one embodiment, the GUI 200 may include a toolbar 214 to control search parameters such as a parameter to control whether all word-forms of a word are required, a parameter to control whether the entire text of a dictionary is to be searched, to start a tutor, etc. An information banner 216 may be used communicate information to the user.

Figure 2D:
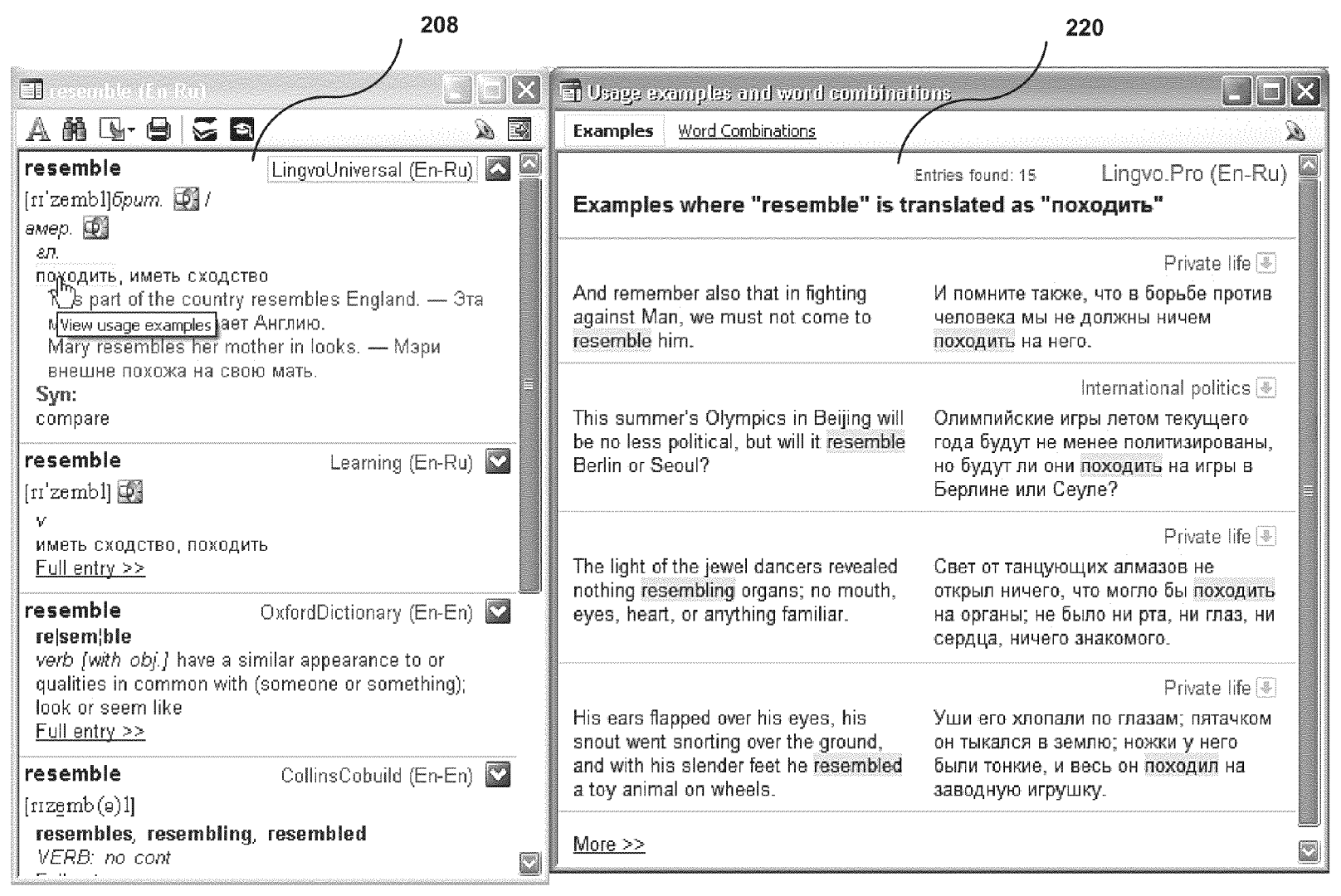

As illustrated in FIG. 2D, a user may obtain sentences with parallel original and translated words from corpora or parallel texts. As illustrated, in one embodiment, the user selects one of the provided translations and parallel texts are searched with the pair of the original word and a selected translation. As a result, corresponding sentences in both languages are displayed thereby permitting the user to view examples of use in various contexts. For example, in FIG. 2D, the panel 220 displays pairs from parallel text corpora where the English verb "resemble" is translated into Russian as " походить ."

Figure 3:
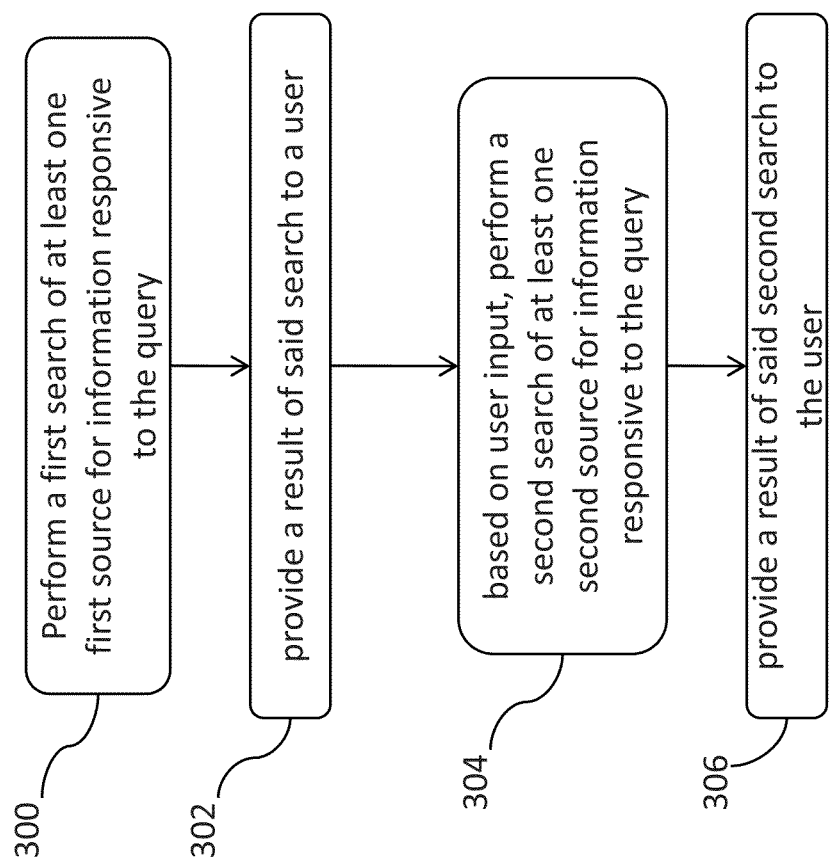
FIG. 3 shows a flowchart of operations performed by client dictionary software, in accordance with one embodiment of the invention.

Referring to FIG. 3, in accordance with one embodiment, there is shown a flowchart of operations performed by the client dictionary application 108, in order to perform a dictionary search or query using the GUI 200. To begin, a user enters a search string or query comprising one or more words. The search string may be entered using any of the input methods provided by the GUI 200. To recap, the GUI 200 provides a search entry window 202, wherein a search string may be entered. The GUI 200 also provides a word list 204 so that the user can select a known or available word therefrom to include in the search string. Further, the GUI 200 allows for a word to be selected from a separate or unrelated text application so that the selected word may be used as part of the search string.

At block 300, responsive to entry of the search string in the manner described, the client dictionary application 108 performs a search (also "first search") of at least one source (e.g., "first source") for information responsive to a query. The first source may comprise one or more local dictionaries 112.

At block 302, the result of the first search may be displayed in one or more dictionary entry windows 208. If the user is dissatisfied with the search result, the user can instruct the client dictionary application 108 to perform another search (also "second search"), using the GUI 200 in the manner described above. This latter or second search is preferably of additional dictionaries or other dictionaries. In one embodiment, the additional dictionaries may comprise various kinds of dictionaries including translation dictionaries, monolingual dictionaries, specialized dictionaries, topical or subject dictionaries, professional dictionaries, etc. Additionally, other resources may be searched, using—for example—other intranet—or Internet resources, such as, text corpora, TM-bases, forums, and online-encyclopedias. For translation dictionaries, a translation direction (i.e., the source and the target languages) may be established either explicitly or implicitly using the GUI 200. The second search is performed at block 304 and the results thereof are provided at block 306 via one or more dictionary entry windows 208.

In accordance with one embodiment, there may be at least two variants in which additional dictionaries or other resources may be located on a server device 104. In the first variant, the shell 110 "knows" about the dictionary. A link to the dictionary is stored in the shell and may be activated by the shell 110 either automatically or optionally. This type of remote dictionary is termed "connected." In the second variant, the dictionary or other resource is simply located on the server device 104 which works with distributed shells which do not "know" about the dictionary. This type of remote dictionary or other resource is termed "not connected."

In one embodiment, the user may immediately obtain translations and definitions found both in the locally installed dictionaries and in online dictionaries and/or other resources. If no entry is found in the local dictionaries or other resources, entries from online dictionaries are displayed, if available. Entries from online dictionaries may be shown in the same window as local or in separate windows.

In one embodiment, entries from additional dictionaries may be shown as a link which allows the user to see these entries. The additional translations, which are found in "not connected" dictionaries or other resources are shown by a link, for example, "7 more (online entries)>>." When the user presses or activates the link to the additional references, additional translations or definitions are downloaded or transferred into the dictionary entry window.

In another embodiment, the user may set up the shell to obtain translations from online dictionaries or other resources only upon clicking an appropriate link (e.g. "view entries from online dictionaries").

In still another embodiment, the number of lookups in the disconnected dictionaries or other resources may be restricted. For example, the user may have a restricted number of free connections and may need to make a payment to permanently connect to or access a dictionary or fulfill some other condition. In this case, each dictionary on the server may be provided with a counter which controls the number of free dictionary lookups available to a user. Once the number of free lookups is used up, the user will still be informed that the dictionary contains the requested word, but the user will need to connect this dictionary to the shell in order to view the entry.

In still another embodiment, the dictionary or other resource may be "advertised." In this case, together with the translations from the connected online dictionaries, the user will also obtain translations from the advertised dictionary, but the counter of this dictionary will be disabled for a certain time period for promotional purposes. The entries from the advertised dictionary may include a small advertising banner with a link to a website with detailed information about the dictionary. In still another embodiment, the additional dictionary or other resources also may be free, created by users, etc. Additional dictionary may be offered depending on an interface language, one or more regional settings, etc. Additional dictionaries may be created and restricted to use by users of a particular user group. Such dictionaries may be downloaded depending on a user's rights or dictionary availability. There may be online-dictionaries that can be enriched by users directly. One example of such dictionary may be a wiki-based dictionary where registered users have permission to enter definitions, provide examples of use, and other information.

When connecting a dictionary to the shell, the user may select an installation method: the dictionary may be downloaded and installed locally or it may be used remotely as an online dictionary, i.e., the shell will need to access the server to obtain entries from this dictionary. That is, the entire dictionary is not downloaded or transferred, but merely each definition as queried by a user via an electronic device. The shell may also display a catalog of dictionaries located on the server and may be updated at regular intervals so that the user may see information about dictionaries without visiting a website affiliated with, advertising for, or otherwise having information related to a particular dictionary. The update may add words from the online dictionary to a wordlist (a list of entries from one or more dictionaries that are available to a user that is forming a query), and display available translations when the user points a cursor or mouse pointer to a word.

Various embodiments of the invention provide the user with additional search results from online dictionaries or other resources and may also provide a mechanism for selling dictionary content. A dictionary and other resources may be advertised or a dictionary may be offered for sale or for access (e.g., a one-time access, access for a defined time period) when the user needs to look up words in it, i.e., when there is a matching language pair and entry of a particular word or expression being sought.

Additionally, the use of online dictionaries and other online resources greatly reduces the size of distribution packages. For example, when a user decides to download a trial version, the size of the distribution package matters. In still another embodiment, the distribution package may include only online dictionaries which the user may download at a later stage, if required or desired. Additionally, the user may separately download sound and media files, morphological dictionaries and application resources required for localization.

Figure 4:
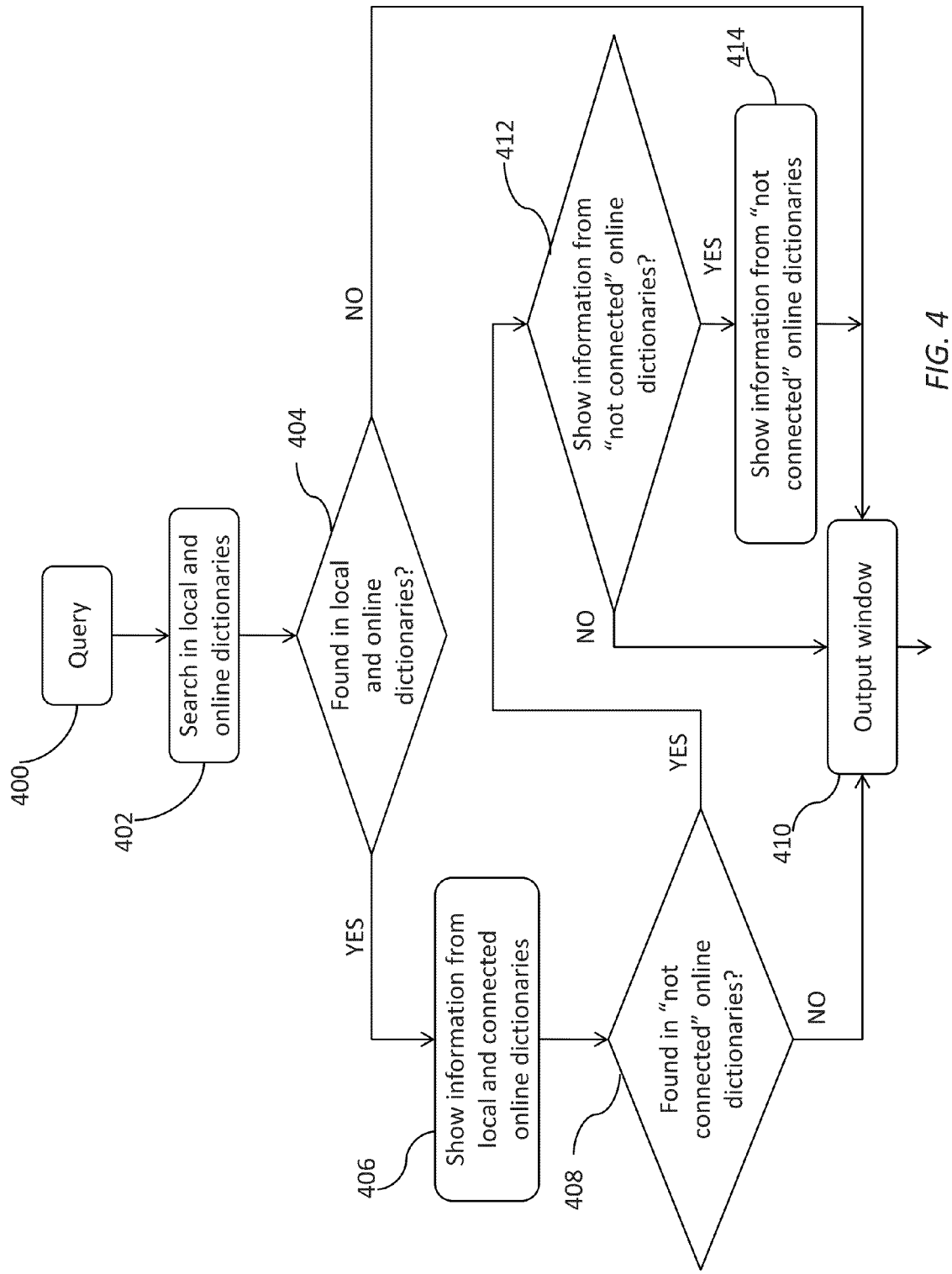
FIG. 4 shows a flowchart of an algorithm for downloading additional search results from the dictionaries, in accordance with one embodiment of the invention.

FIG. 4 shows a flowchart of an algorithm for searching dictionaries and downloading additional search results from online dictionaries, in accordance with one embodiment of the invention. Referring to FIG. 4, at block 400 a query is input into the client dictionary application 108 using the GUI 200 as described. At block 402, responsive to the query, a search is performed across local and online dictionaries. At block 404, a determination is made as to whether dictionary entries corresponding to the query were found in local and online dictionaries. If dictionary entries are found, control passes to block 406 where entries or information found in local and (connected or available) online dictionaries are displayed or shown to the user. This may be achieved, in one embodiment, using one or more dictionary entry windows 208 of the GUI 200.

For pairs of the entry in the source language and a variant of translation in the target language, the search of parallel corpora is executed. If the user wants to see examples of usage of a given result of translation, the user activates a user interface element such as placing a pointer over a word or expression, and, in response, a window, such as the window 220 in FIG. 2D, is opened and the user is provided with examples of relevant parallel sentences.

Figure 4A:
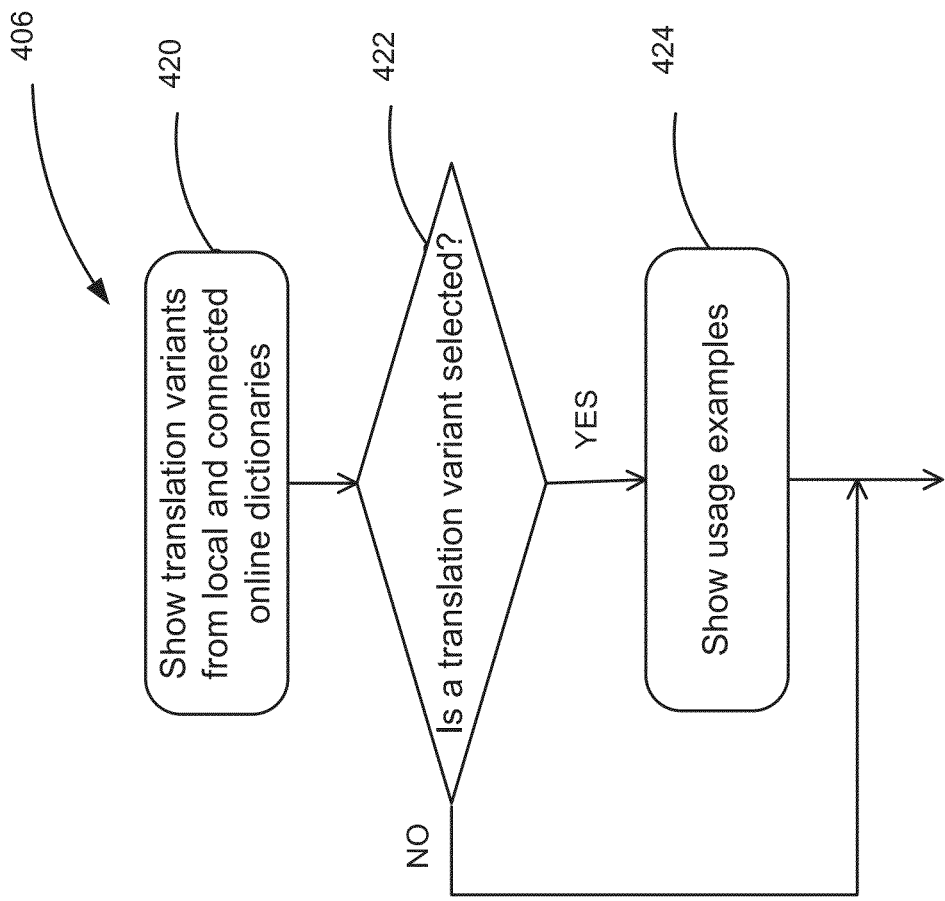
FIG. 4A shows a flowchart of obtaining examples of context with translation variants from parallel corpora, in accordance with one embodiment of the invention.

FIG. 4A is a flowchart for showing examples of context with translation variants from parallel corpora, in accordance with one embodiment of the invention. FIG. 4A shows a variant of block 406 in detail. After one or more dictionary entry windows 208 has been opened (block 420), a translation variant may be selected or highlighted at any time when a user uses a cursor to point at the translation variant. If the user selects the option to view usage examples at 422, an additional panel such as 220 is opened and usage examples are shown (block 424). In one implementation or embodiment, the panel 220 (FIG. 2D) is divided into left and right parts or panes and the panel 220 displays pairs from parallel text corpora. In the example shown in FIG. 2D, the English verb "resemble" is translated into Russian as " походить." Thus, according to the described scheme a user can view examples of usage in various contexts.

In one embodiment, examples of pairs or sets of parallel texts from parallel text corpora are shown in random order. In another embodiment, examples may be sorted. Various implementations of sorting may be different, for instance, each pair may be given a ranking that is estimated according to relevance. The relevance may be estimated or calculated based on one or more factors. If the field of interest of a user is known to the system (for example, manually defined or determined automatically in some way, such as by means of analyzing previous queries or actions of the user) then specialized corpora may be searched and these results are displayed at first. Or, searching may be executed concurrently in all available parallel corpora, but each result may get an additional bonus for relevance, and examples are sorted by ratings that include the bonuses.

Various types of ratings may be taken into account. For example, databases or parallel corpora may be shared by many users of an Internet portal, including experts, who can estimate the quality and accuracy of translations. Experts or other users may flag an example as incorrect, then the flagged pair is penalized and the ranking is adjusted accordingly. If the example is penalized, it can be removed from further search.

In one embodiment, parallel corpora are indexed. After indexing, a correspondence between words from "left" and "right" sentences (e.g., sentences from a pair of languages) is established and checked by internal dictionaries. The level of correspondence is estimated, and examples with low ratings are penalized. A quick heuristic method, using only two-language dictionaries, estimates the degree of correspondence between the fragments in one language and the corresponding fragment in another language. The two-language dictionary may be created from a normal dictionary as a normalized one-to-one word dictionary, which can include all lexical values, homonyms and parts of speech. The two-language dictionary also can include all word forms; otherwise, each word in a sentence should be subjected to a morphological analysis. As part of verifying a hypothesis about correspondence between the two fragments, an estimation of a correspondence value is calculated. This value may be based on the ratio of the percentage of words with the corresponding word in the translation in the corresponding fragment found in the dictionary to the sizes of the fragments (e.g., number of words in the fragment, number of sentences in the fragment) and, optionally, to other parameters, for example, length of sentences or frequency of word combinations calculated on the basis of an analysis of text corpora, capitalization, distance between words and word order, etc.

In another embodiment, a more rigorous method of analyzing is used, a method which involves applying exhaustive linguistic analyzing for estimating a degree of correspondence of fragments in one language and a fragment (sentence) in another language.

As one example, a method of deep linguistic analyzing of natural languages is the method disclosed in U.S. Pat. No. 8,078,450. This patent is incorporated by reference to the extent that it is not inconsistent with the teachings herein. This method includes a lexico-morphological analysis, syntactic and semantic analysis and building a semantic structure for each sentence. The implementation of the method of analyzing of natural languages allows the system to solve the problem of lexical ambiguity, grammatical and semantic homonymy, to retrieve and save all lexico-morphological, syntactical and semantic information about a sentence, its parts, words and their relations in the sentence, meanings of words and meaning of the whole sentence, and even relations between sentences.

Next, using results of preprocessing parallel corpora, the method includes sorting variants of translations may be applied at step 420. Referring to FIG. 2A, variants of translation for the word "reinstate," such as " восстанавливать ," " порядок ," " поправлять " may be ordered in the dictionary entry windows 208. All the translations may be displayed in a list and are sorted based on the frequency of their appearance in parallel texts. Such ranking of translations is useful because such ranking includes the influence of the statistics of word usage in texts. The ranking works as follows. Pairs of word and their translation variants are indexed across the base of parallel texts; the number of the examples where the pair is found is assigned to each translation variant. Further, all the translation variants for one word are sorted in accordance with this value. The more examples the translation variant has, the higher the particular word appears in search results.

Additionally, the efficiency of the search may be improved if diacritics are processed in the right way. If the user searches for a word or a collocation that must be written with an accent (or some other diacritic), and the user didn't put the diacritical mark with the word, the system offer the user through a user interface a list of similar words, including words with diacritics.

At the same time, results from examples are found with an accent (diacritical mark) even if the search query is entered without any accent.

EXAMPLES

In languages having diacritics there are allowed and forbidden interpretations of diacritics and ligatures. For example, in German it is allowed the substitution of symbols "ü" to "ue" and vice versa. But, it is impossible to use the substitution of "ü" for "u". In Russian it is allowed to replace " ё " with "e," but not vice versa, and it is impossible to replace " й " to " и ". The user may enter any variant: "Burge" or "Buerge" instead of "Bürge." If a user enters a word with diacritics, then if an allowed substitution of diacritics exists, examples with diacritics and also examples without diacritics are searched in corpora. On the other hand, if a user enters a word without diacritics, and there may be a hypothesis about the presence of diacritics generated, then the hypothesis is checked along with the text corpora. If such examples of the word with diacritics are found, the examples of translations also are searched in parallel corpora.

Referring again to FIG. 4, if no entry is found at block 404, then control passes to block 412. At block 412 the client dictionary application 108 determines if entries or information should be displayed or shown from "not connected" online dictionaries. This determination is based on user input indicating whether the additional dictionaries should be searched or whether information from the additional dictionaries should be displayed, as described above. Block 414 executes in cases where it is determined that the information from the "not connected" dictionaries should be shown. At block 414, information from the "not connected" dictionaries is shown in the manner already described.

In one embodiment, the invention discloses a method for providing custom messages to users. The messages are customized based on type of license under which the dictionaries are provided, with reference to the dictionaries used by the client dictionary application 108, etc.

With reference to FIG. 2B, in one embodiment, the information banner 216 may be used for displaying custom messages sent by the server device 104 to the user. These messages may include tips, advertising messages, informational messages, etc. A message may be in the form of a link to a website that contains more information. In one embodiment, the user may close the banner 216, in which case the banner will be displayed again whenever a new message is delivered the server device 104. The user may be allowed to disable the banner 216, in which case it is not displayed again.

The messages may be selected and customized based on interface language, regional settings, and version of the product. Advantageously, trial versions of dictionaries may have different messages from paid or non-trial versions. For example, for trial versions, a warning message will be sent informing the user that a trial period is about to expire. Additionally, the server device 104 has the capability to detect whether the version used by a user is an authorized copy of the application or not, and has the capability to send customized messages to users of unauthorized versions.

In one embodiment, the information banner 216 may be used to display tips and advice on working with the product, to inform the user about new dictionaries/releases/products, and to organize competitions and polls. Additionally, the information banner 216 may be used to communicate to the users of the trial versions the benefits of corresponding non-trial versions. The information banner 216 may contain graphics, sound, and other media files e.g., pictures, sound files, Adobe® Flash content.

FIG. 5 of the drawings shows hardware 500 that may be used to implement the user computer device 102 or the server device 104, in accordance with one embodiment of the invention. Referring to FIG. 5, the hardware 500 typically includes at least one processor 502 coupled to a memory 504. The processor 502 may represent one or more processors (e.g. microprocessors), and the memory 504 may represent random access memory (RAM) devices comprising a main storage of the hardware 500, as well as any supplemental levels of memory, e.g., cache memories, non-volatile or back-up memories (e.g. programmable or flash memories), read-only memories, etc. In addition, the memory 504 may be considered to include memory storage physically located elsewhere in the hardware 500, e.g., any cache memory in the processor 502 as well as any storage capacity used as a virtual memory, e.g., as stored on a mass storage device 510.

The hardware 500 also typically receives a number of inputs and outputs for communicating information externally. For interface with a user or operator, the hardware 500 may include one or more user input devices 506 (e.g., a keyboard, a mouse, imaging device, scanner) and a one or more output devices 508 (e.g., a Liquid Crystal Display (LCD) panel, a sound playback device (speaker)).

For additional storage, the hardware 500 may also include one or more mass storage devices 510, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 500 may include an interface with one or more networks 512 (e.g., a local area network (LAN), a wide area network (WAN), a wireless network, and/or the Internet among others) to permit the communication of information with other computers coupled to the networks. It should be appreciated that the hardware 500 typically includes suitable analog and/or digital interfaces between the processor 502 and each of the components 504, 506, 508, and 512 as is well known in the art.

The hardware 500 operates under the control of an operating system 514, and executes various computer software applications, components, programs, objects, modules, etc. to implement the techniques described above. In particular, the computer software applications will include the client dictionary application 108, in the case of the client user device 102, and the server dictionary software, in the case of the server device 104. Moreover, various applications, components, programs, objects, etc., collectively indicated by reference 516 in FIG. 5, may also execute on one or more processors in another computer coupled to the hardware 500 via a network 512, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash-memory etc.), among others. The other type of distribution may be downloading files from an internet-site.

In the description provided, for purposes of explanation, numerous specific details are set forth in order to provide a thorough understanding of the invention. It will be apparent to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

While certain exemplary embodiments have been described and shown in the accompanying drawings, such embodiments are merely illustrative and not restrictive of the broad invention and this invention is not limited to the specific constructions and arrangements shown and described, since various other modifications may occur to those ordinarily skilled in the art upon studying this disclosure. The disclosed embodiments may be readily modifiable in arrangement and detail as facilitated by enabling technological advancements without departing from the principals of the present disclosure.

We claim:

1. An electronic device for identifying a set of parallel texts from a corpora of texts, the device comprising:
   a display capable of displaying a user interface;
   a processor;
   a memory in electronic communication with the processor, the memory configured with instructions for performing steps including:
      identifying a corpora containing two or more parallel texts;
      receiving a selection of a text fragment in a first language;
      performing a query on the corpora based on the text fragment to identify a set of parallel texts that include the text fragment in the first language and a substantially equivalent translation of the text fragment in a second language;
      wherein the identifying the set of parallel texts comprises
         performing a syntactic and semantic analysis of the text fragments; the syntactic and semantic analysis of the fragments comprises building a language-independent semantic structure for one or more sentence of the text fragments; and
         establishing a correspondence between the language-independent semantic structures built for said parallel texts;
      determining a ranking for the identified parallel texts based on the text fragments, wherein the ranking is based on a frequency of the text fragments occurring in the set of parallel texts; and
      displaying on the user interface the ranked set of parallel texts.

2. The electronic device of claim 1, wherein the text fragment is a first text fragment that does not contain a diacritical mark, wherein the instructions further include a step of creating a second text fragment with a diacritical mark based on the first text fragment, and wherein the ranking is further based on the second text fragment.

3. The electronic device of claim 1, wherein selecting the text fragment includes the steps of:
   searching in dictionaries for variants of the text fragment;
   selecting variants of the text fragment; and
   displaying in a graphical user interface selected variants of the text fragment.

4. The electronic device of claim 3, wherein searching dictionaries includes searching in a network accessible dictionary.

5. The electronic device of claim 1, wherein displaying on the user interface the set of parallel texts includes:
   displaying pairs of identified parallel texts; and
   displaying in an emphasized manner a portion of each identified parallel text that corresponds to the text fragment.

6. The electronic device of claim 1, wherein ranking the identified parallel texts based on the text fragment includes one or more of:
   estimating a frequency of the identified parallel texts based on the text fragment;
   estimating a value related to relevance to a field of interest;
   estimating a value related to ratings or penalties of a translation of the text fragment; and estimating a ratio of percentage of words with a corresponding word in a translation of the text fragment in a corresponding fragment found in the dictionary to a count of words in the respective fragments.

7. The electronic device of claim 1 or 6, wherein determining the ranking for the identified parallel texts based on the text fragment further includes one or more of:
   estimating a frequency of word combinations of the words in the text fragment in the corpora;
   estimating capitalization relative to the text fragment;
   estimating distance between words of the text fragment in the corpora; and
   estimating of word order of the text fragment in the corpora.

8. The electronic device of claim 1, wherein the identifying parallel texts through performing the query on the corpora based on the text fragment to identify the set of parallel texts comprises:
   performing a linguistic analysis of natural language parallel texts wherein the linguistic analysis includes a lexico-morphological analysis.

9. A computer-implemented method for identifying a set of parallel texts from a corpora of texts, the method comprising:
   identifying a corpora containing two or more parallel texts;
   receiving a selection of a text fragment in a first language;
   performing a query on the corpora based on the text fragment to identify a set of parallel texts that include the text fragment in the first language and a substantially equivalent translation of the text fragment in a second language;
   wherein the identifying the set of parallel texts comprises
      performing a syntactic and semantic analysis of the text fragments; the syntactic and semantic analysis of the fragments comprises building a language-independent semantic structure for one or more sentence of the text fragments; and
      establishing a correspondence between the language-independent semantic structures built for said parallel texts;
   determining a ranking for the identified parallel texts based on the text fragments and on a frequency of the text fragments occurring in the set of parallel texts; and
   displaying on the user interface the ranked set of parallel texts.

10. The method of claim 9, wherein the text fragment is a first text fragment, wherein the first text fragment includes a text fragment that does not contain a diacritical mark, wherein the method further comprises:
   creating a second text fragment with a diacritical mark based on the first text fragment, and wherein determining the ranking for the identified parallel texts is further based on the second text fragment.

11. The method of claim 9, wherein selecting the text fragment in the first language includes:
   searching in dictionaries for variants of the text fragment;
   selecting variants of the text fragment;
   displaying in a graphical user interface selected variants of the text fragment; and
   detecting through an element of the graphical user interface a selection corresponding to one of the selected variants of the text fragment.

12. The method of claim 9, wherein displaying on the user interface the ranked set of parallel texts includes:
   displaying pairs of identified parallel texts; and
   displaying in an emphasized manner a portion of each identified parallel text that corresponds to the text fragment.

13. The method of claim 9, wherein determining the ranking for the identified parallel texts based on the text fragment includes one or more of:
   estimating a frequency of the identified parallel texts based on the text fragment;
   estimating a value related to relevance to a field of interest;
   estimating a value related to ratings or penalties of a translation of the text fragment; and
   estimating a ratio of percentage of words with a corresponding word in a translation of the text fragment in a corresponding fragment found in the dictionary to a count of words in the respective fragments.

14. The method of claim 9, wherein determining the ranking for the identified parallel texts based on the text fragment further includes one or more of:
   estimating a frequency of word combinations of the words in the text fragment in the corpora;
   estimating capitalization relative to the text fragment;
   estimating distance between words of the text fragment in the corpora; and
   estimating of word order of the text fragment in the corpora.

15. The method of claim 9, wherein performing the query on the corpora based on the text fragment to identify a set of parallel texts comprises:
   analyzing natural language parallel texts wherein the analyzing includes a lexico-morphological analysis.

16. One or more physical non-transitory computer-accessible media encoded with instructions comprising:
   identifying a corpora containing two or more parallel texts;
   receiving a selection of a text fragment in a first language;
   performing a query on the corpora based on the text fragment to identify a set of parallel texts that include the text fragment in the first language and a substantially equivalent translation of the text fragment in a second language;
   wherein the identifying the set of parallel texts comprises
      performing a syntactic and semantic analysis of the text fragments; the syntactic and semantic analysis of the fragments comprises building a language-independent semantic structure for one or more sentence of the text fragments; and establishing a correspondence between the language-independent semantic structures built for said parallel texts;

determining a ranking for the identified parallel texts based on the text fragments and on a frequency of the text fragments occurring in the set of parallel texts; and displaying on the user interface the ranked set of parallel texts.

17. The one or more physical non-transitory computer-accessible media of claim 16, wherein the text fragment is a first text fragment that does not contain a diacritical mark, wherein the instructions further comprise:

creating a second text fragment with a diacritical mark based on the first text fragment, and wherein said determining the ranking for the identified parallel texts is based on the second text fragment.

18. The one or more physical non-transitory computer-accessible media of claim 16, wherein identifying the text fragment includes at least one of:

searching in dictionaries for variants of the text fragment;

selecting variants of the text fragment;

displaying in a graphical user interface selected variants of the text fragment; and detecting through a user interface element of the graphical user interface a selection corresponding to one of the selected variants of the text fragment.

19. The one or more physical non-transitory computer-accessible media of claim 16, wherein displaying on the user interface the ranked set of parallel texts includes:

displaying pairs of identified parallel texts; and displaying in an emphasized manner a portion of text in each identified parallel text that corresponds to the text fragment.

20. The one or more physical non-transitory computer-accessible media of claim 16, wherein determining the ranking for the identified parallel texts based on the text fragment includes one or more of:

estimating a frequency of the identified parallel texts based on the text fragment;

estimating a value related to relevance to the field of interest of a user;

estimating a value related to ratings or penalties made by experts; and estimating a ratio of percentage of words with a corresponding word in a translation of the text fragment in a corresponding fragment found in the dictionary to a count of words in the respective fragments.

21. The one or more physical non-transitory computer-accessible media of claim 16, wherein determining the ranking for the identified parallel texts based on the text fragment further includes:

estimating a frequency of word combinations of the words in the text fragment in the corpora;

estimating capitalization relative to the text fragment;

estimating distance between words of the text fragment in the corpora; and estimating of word order of the text fragment in the corpora.

22. The one or more physical non-transitory computer-accessible media of claim 16, wherein identifying parallel texts through querying the set of corpora of parallel texts based on the text fragment includes:

analyzing natural language parallel texts comprising performing a lexico-morphological analysis.

\* \* \* \* \*